United States Patent
Lack

(10) Patent No.: US 8,007,555 B2
(45) Date of Patent: Aug. 30, 2011

(54) FILTER WITH MULTIPLE SECTIONS OF DIFFERENT MEDIA

(76) Inventor: Nicholas L. Lack, Palos Heights, IL (US)

( * ) Notice: Subject to any disclaimer, the term of this patent is extended or adjusted under 35 U.S.C. 154(b) by 420 days.

(21) Appl. No.: 12/058,720

(22) Filed: Mar. 30, 2008

(65) Prior Publication Data

US 2009/0241490 A1    Oct. 1, 2009

(51) Int. Cl.
*B01D 46/00* (2006.01)
*B01D 53/02* (2006.01)

(52) U.S. Cl. ............... 55/483; 55/484; 55/495; 55/511; 95/129; 95/134; 95/137; 95/139; 96/153

(58) Field of Classification Search ............... 55/483, 55/484, 485, 524, 495, 511, DIG. 31; 96/153; 95/129, 134, 137, 139
See application file for complete search history.

(56) References Cited

U.S. PATENT DOCUMENTS

| | | | |
|---|---|---|---|
| 4,578,091 A * | 3/1986 | Borja | 95/214 |
| 4,732,675 A * | 3/1988 | Badolato et al. | 210/314 |
| 5,037,455 A * | 8/1991 | Scheineson et al. | 96/17 |
| 5,221,520 A * | 6/1993 | Cornwell | 422/122 |
| 5,264,196 A * | 11/1993 | Tanaka et al. | 423/258 |
| 5,503,806 A * | 4/1996 | Fulmer et al. | 422/164 |
| 5,782,944 A * | 7/1998 | Justice | 55/495 |
| 5,956,944 A * | 9/1999 | Dementhon et al. | 60/274 |
| 6,344,071 B1 * | 2/2002 | Smith et al. | 95/274 |
| 6,372,004 B1 * | 4/2002 | Schultink et al. | 55/382 |
| 6,726,751 B2 * | 4/2004 | Bause et al. | 96/134 |
| 6,916,352 B2 * | 7/2005 | Sutton et al. | 55/483 |
| 7,014,693 B2 * | 3/2006 | Kishkovich et al. | 96/413 |
| 7,022,164 B2 * | 4/2006 | Kishkovich et al. | 95/285 |
| 7,029,516 B2 * | 4/2006 | Campbell et al. | 95/90 |
| 7,341,618 B2 * | 3/2008 | Bayer et al. | 96/108 |
| 7,416,581 B2 * | 8/2008 | Raetz et al. | 95/90 |
| 7,540,901 B2 * | 6/2009 | Kishkovich et al. | 95/141 |
| 2005/0217226 A1 * | 10/2005 | Sundet et al. | 55/521 |
| 2007/0084168 A1 * | 4/2007 | Ashwood et al. | 55/486 |
| 2007/0227359 A1 * | 10/2007 | Choi | 96/11 |
| 2008/0264259 A1 * | 10/2008 | Leung | 96/143 |

* cited by examiner

*Primary Examiner* — Robert Clemente
(74) *Attorney, Agent, or Firm* — Davis M. Chin, Jr.; Davis Chin

(57) ABSTRACT

A panel air filter assembly, for use in heating, ventilating and air conditioning (HVAC) systems, which has a single filter element with multiple portions. The single filter element is sectioned into substantially equally-dimensioned and separate filter portions. Each of the filter portions includes a specific type of medium and is distinct from one another, so as to remove different types of contaminants from the outdoor supply air before entering heating, ventilating and air conditioning systems. A waterproof paperboard frame securely supports the filter element at the filter element's marginal edges.

14 Claims, 4 Drawing Sheets

FILTER WITH MULTIPLE SECTIONS OF DIFFERENT MEDIA

BACKGROUND OF THE INVENTION

1. Field of the Invention

This invention relates generally to air filters used to filtrate and clean the air of contaminants, and more particularly, the present invention relates to a multi-sectioned filter, which has different media to remove different types of contaminants from the outdoor supply air, before entering the occupied spaces of large buildings, via heating, ventilating and air conditioning (HVAC) systems.

2. Description of the Prior Art

As Americans, Chinese, Indians, and the world in general, increasingly consume more gas, coal and other fossil fuels, it is inevitable that unhealthy pollutants will continue to contaminate the atmospheric air. Unfortunately, this trend will persist because the already existing, and the emerging, industrialized countries rely heavily on cars for transportation, manufacturing for consumer products and trucking to deliver those consumer products, to name only a few examples. The pollutant by-products released into the air from the world's energy consumption are not, however, the only contaminants found in the atmospheric air. Particulate material and gases, not only generated from industrial processes, but also generated by nature and by man, are also in the air.

Despite great efforts to clean up the environment, the air is still not very clean because the amount of pollutants released into the air each year far exceeds the beneficial gains made from the clean up effort. Unless and until we, as a world community, change our ways of life, dangerously unhealthy pollutants will undoubtedly contaminate the air we breathe.

This is a major health concern especially for commercial, residential and institutional building owners and managers whose obligation is to provide a high indoor air quality for the building's occupants and tenants. Ironically, during the oil crisis in the mid-1970's, when the building owners and managers tried to save energy by using less outdoor air in the air conditioning systems, the end result was an increase in contaminants within the occupied spaces of the building and a dramatic decrease in overall indoor air quality. These results occurred due to the manner in which heating, ventilating and air conditioning (HVAC) systems operate in large buildings.

In order to circulate air throughout a large building, such as a school or an office building, atmospheric air is drawn into the HVAC system and passes through a series of filters before it reaches the occupied spaces of the building. Because the process of drawing air into the building (and ventilating air out of the building) is relatively expensive, the building managers aim to limit the frequency of this process. So instead of constantly drawing air into the building, the managers re-circulate (a less expensive process) the air that has already been drawn into the building's occupied spaces.

Since most building managers adhere to the notion of conserving energy, and in turn money, the managers continuously re-circulate the air and prolong ventilating the air until it is absolutely necessary. Given this and the fact that the type of pollutants that are filtered out of the air, which are drawn into the building, are limited to the number of filter banks used in the HVAC system, it is important for the manager to correctly identify which type of media filters to use in the system.

Generally, large building filter banks consist of two or more sets of filters. The first stage filters, pre-filters, are located on the outermost section of the HVAC system. The pre-filters are coarse, low-efficiency filters that remove large particles and debris. Although the pre-filters achieve their designed purpose to protect the blowers and other mechanical components of the ventilation system, the pre-filters are not effective in removing submicrometer particles from the air. Thus, the removal of these submicrometer pollutants is dependent on the performance of the additional downstream filters.

As mentioned before, the type of media filter determines the type of pollutant that will be filtered out of the air. There are numerous amounts of media to chose from, some of which are zeolites, alumina and polymer sorbents. However, the most common type of medium used is activated carbon. Activated carbon is the medium most often used because of its ability to be treated with a wide range of different chemicals, which adsorb specific types of pollutants. Carbon, by itself, does not have a great capacity to remove lower boiling point gases (pollutants), but when the carbon is treated with a specific chemical the treated carbon will remove the corresponding type of pollutant. This treatment is commonly referred to as impregnation.

Money conscious managers usually try to cut their budget by using impregnated carbon filters that are only coated with one type of chemical and that remove only the necessary pollutants. Since the entire HVAC system typically has only two to three downstream filters, only two to three different types of pollutants are filtered out of the atmospheric air, leaving other pollutants in the ambient air at the detriment of the building's occupants.

Surprisingly, a single multi-sectioned panel air filter, which has different media, has not been developed and constructed heretofore in the prior art so as to remove different types of contaminants from the outdoor supply air, before entering the occupied spaces of large buildings, via heating, ventilating and air conditioning systems. Because a filter like this is not in the prior art, it would be desirable to provide such a filter device like this in order to improve the air quality in large buildings.

A prior art search directed to the subject matter of this application in the U.S. Patent and Trademark Office revealed the following Letters Patent:

| |
|---|
| 4,578,091 |
| 5,264,196 |
| 5,503,806 |
| 5,956,944 |
| 6,344,071 |

In addition to the above issued prior art utility patents, there was also found Patent Application Publication No. 2007/0084168 dated Apr. 19, 2007 to Ashwood et al. and Japanese Patent Publication No. 2004183746 dated Jan. 12, 2006 to Toshifumi et al.

U.S. Pat. No. 6,344,071 to Smith et al. discloses a filter system for filtering contaminants from the air or other gases. The filter system includes a filter canister. Within the filter canister, first plurality of filter media particles are intermixed with second plurality of filter media particles into a single filter bed layer. Alternatively, Smith also teaches that two kinds of filter media particles can be positioned in separate filter bed layers as illustrated in FIG. 2. Thus, within the filter canister, first plurality of filter media particles is positioned in the first filter bed and the second plurality of filter media particles is positioned in the second filter bed. Both examples filter multiple types of gases.

In U.S. Pat. No. 4,578,091 to Borja a multi-chambered air cleaner is disclosed. Although the air cleaning device is adapted for use in conjunction with an internal combustion engine to remove particulate matter emitted from the exhaust of the vehicle, Borja discloses that the dimensions of the air cleaning device may be varied as needed for a particular application. In particular, as shown in FIG. 3, section 14 of the device includes a plurality of filter chambers C, D and E and an exhaust chamber F. The chambers C, D and E are separated from one another by means of dividers/screens that have apertures therein. In this example, filter chamber C is filled with sponge-type material, chamber D is filled with activated carbon and chamber E is filled with non-treated filter material.

U.S. Pat. No. 5,503,806 to Fulmer et al. discloses a varying permeability filter. The filter is mounted in the gas generation chamber and is especially designed to filter out and entrap unwanted contaminants and by-products from the generated gas. The filter eliminates the need for the use of multiple filters because the filter has multiple regions, which are of low, intermediate and high porosity or permeability.

U.S. Patent Application Publication No. 2007/0084168 to Ashwood et al. discloses a flexible size adjustable filter. The filter includes a mixture of natural and synthetic fibers and is mounted on a rigid wire frame member. The filter having the frame member attached thereto is held within the filter housing along the side loading channels.

The remaining patents and publications, listed above but not specifically discussed, are deemed to be only of general interest and show the state of the art in air filters.

None of the prior art discussed above discloses a single multi-sectioned panel air filter with each sectioned filter portion having a different media to remove different types of contaminants from the outdoor supply air, before entering the occupied spaces of large buildings, via heating, ventilating and air conditioning systems.

SUMMARY OF THE INVENTION

Accordingly, it is a general object of the present invention to provide a multi-sectioned, panel air filter assembly, with each sectioned filter portion, having a different media to remove different types of contaminants from the outdoor supply air, before entering the occupied spaces of large buildings, via heating, ventilating and air conditioning systems, but yet overcomes the disadvantages of the prior art.

It is an object of the present invention to provide a multi-sectioned, panel air filter assembly with each sectioned filter portion having a different media to remove different types of contaminants so as to maximize the indoor air quality of large office and school buildings.

It is another object of the present invention to provide a multi-sectioned, panel air filter with each sectioned filter portion having a different media to remove different types of contaminants, which is relatively easy to construct and is affordable in cost.

In a preferred embodiment of the present invention, there is provided a panel air filter assembly, for use in heat, ventilating and air conditioning (HVAC) systems in large buildings, which has a single filter element with multiple portions. The single filter element is sectioned into four substantially equally-dimensioned and separate filter portions. Each of the separate filter portions includes a specific type of medium and is distinct from one another, so as to remove different types of contaminants from the outdoor supply air, before entering the occupied spaces of the large buildings, via heating, ventilating and air conditioning systems. A waterproof paperboard frame securely supports the filter element's marginal edges.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
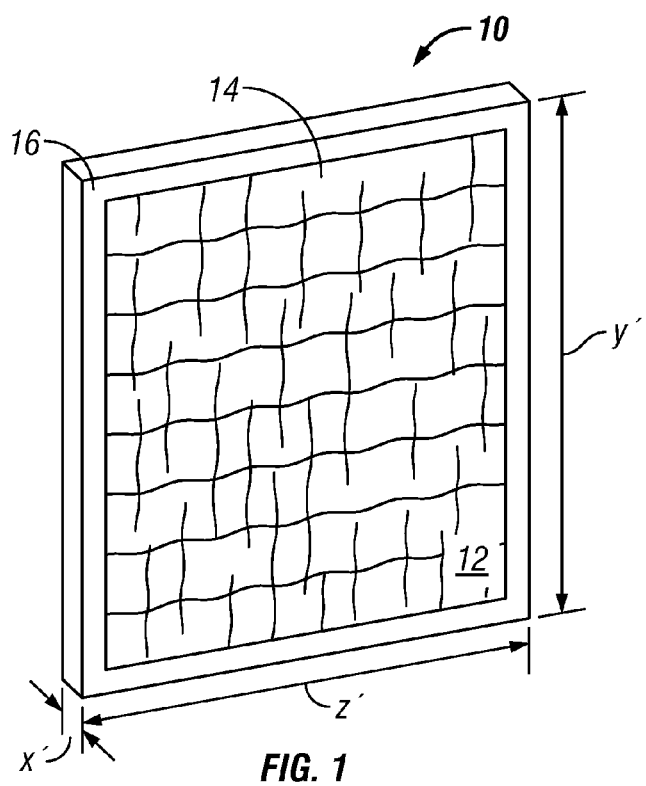
FIG. 1 shows a conventional panel air filter, which has been labeled "Prior Art"

It is to be distinctly understood at the outset that the present invention shown in the drawings and described in detail in association with a multi-sectioned, panel air filter assembly, with each sectioned filter portion having a different media to remove different types of contaminants, is not intended to serve as a limitation upon the scope or teachings thereof, but is to be considered merely for the purpose of convenience of illustration of one example of its application.

Figure 2:
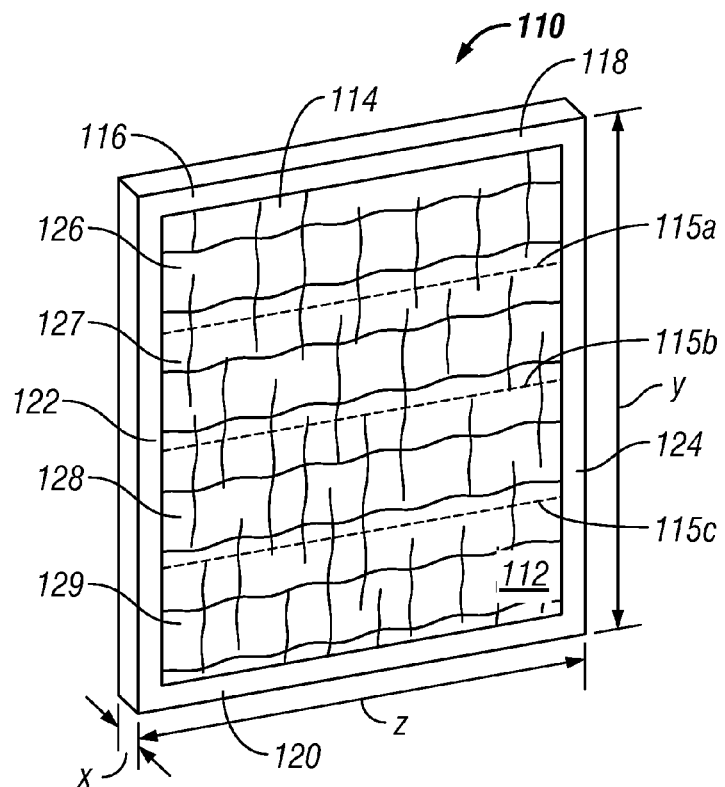
FIG. 2 is a perspective view of a multi-sectioned, panel air filter assembly, with each sectioned filter portion, having a different media to remove different types of contaminants from the air, constructed in accordance with the principles of the present invention.
Figure 3:
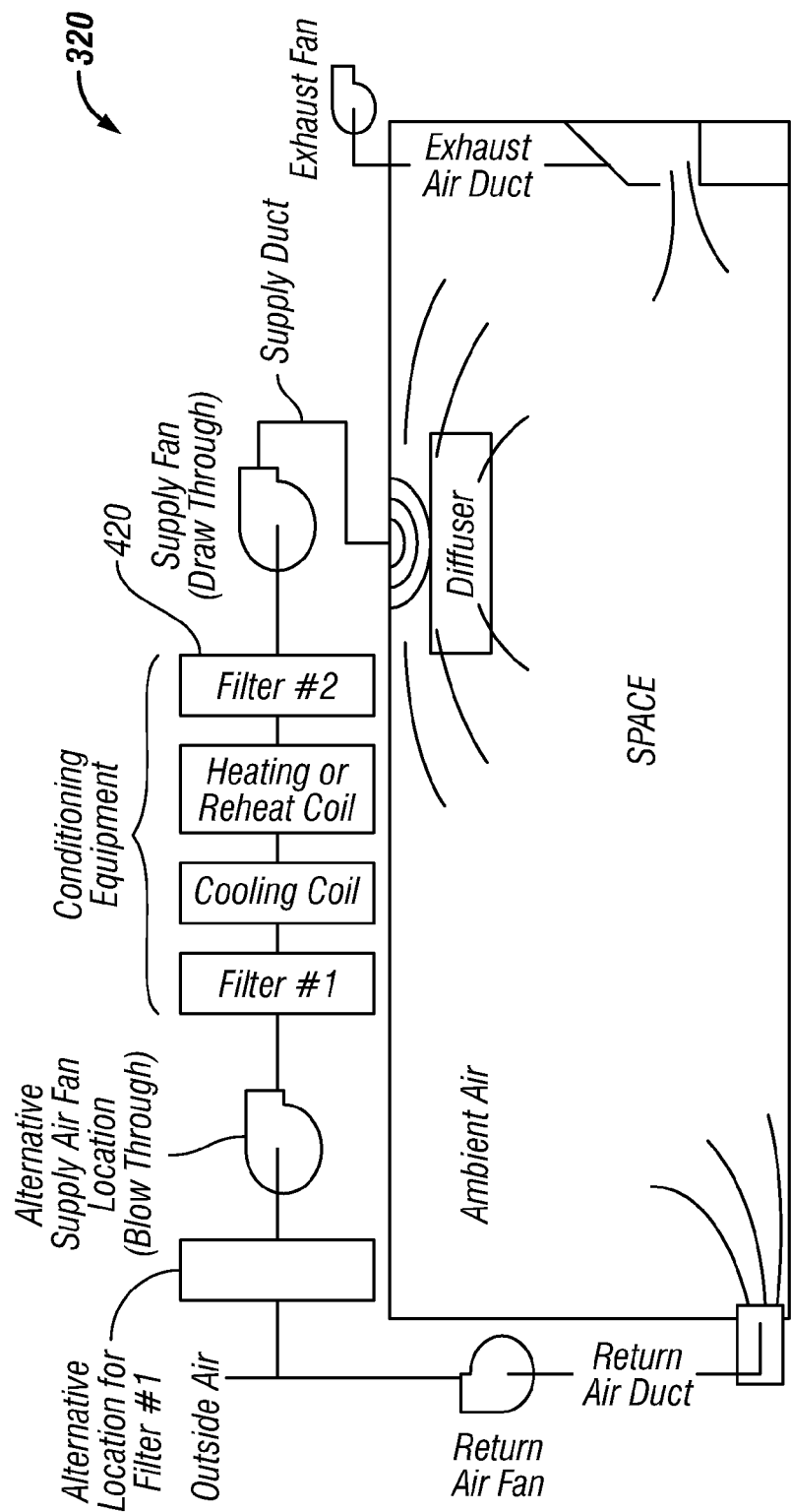
FIG. 3 is a pictorial representation of a conventional large heating, ventilating and air conditioning system, illustrating the particular location of a filter bank 420 within the system.
Figure 4:
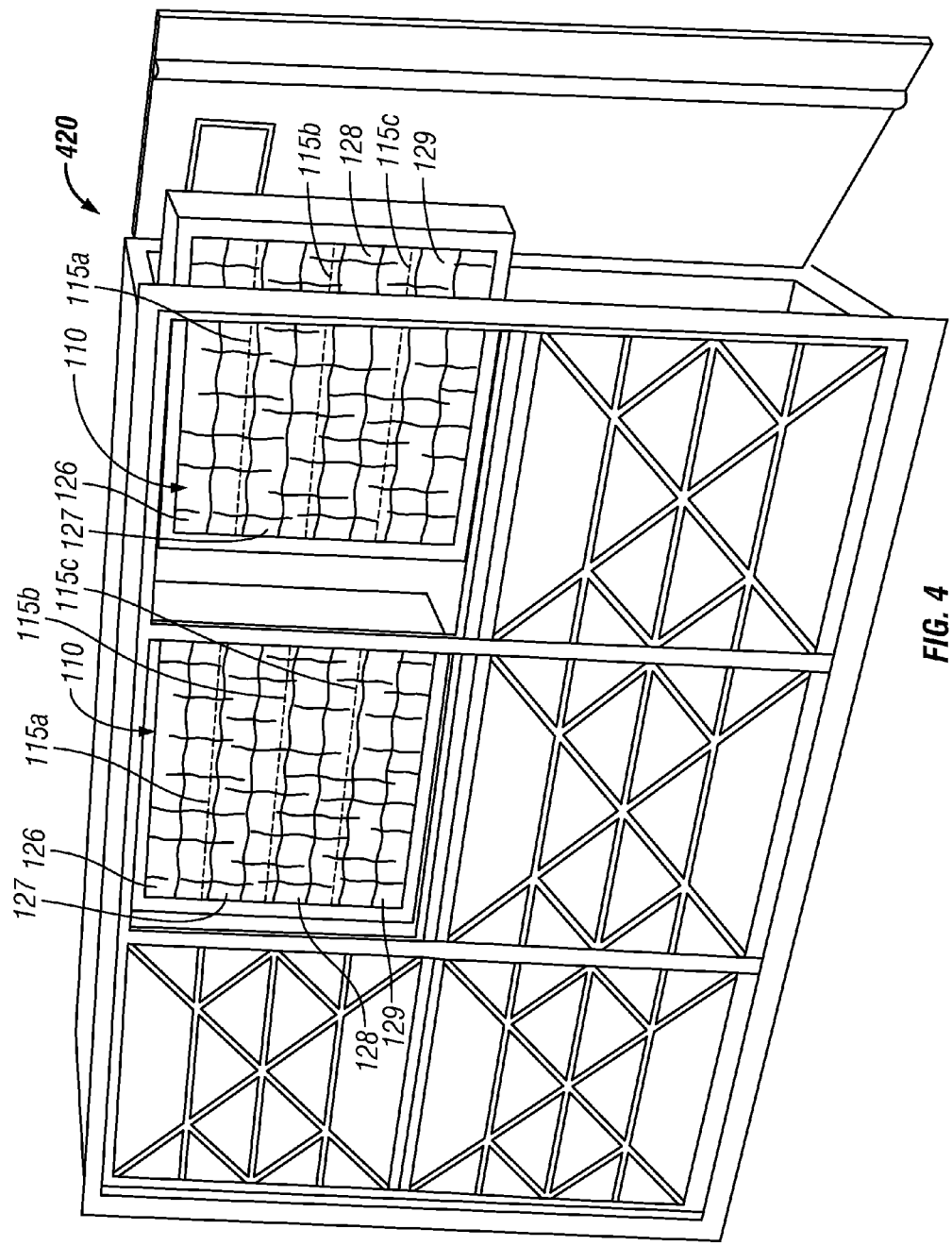
FIG. 4 is a detailed perspective view showing the multi-sectioned, panel air filter assembly 110 in use with the filter bank in the large heating, ventilating and air conditioning systems of FIG. 3.

Referring now in detail to the drawings, wherein like reference characters designate like or corresponding parts throughout the several views, while the prior art is illustrated in FIG. 1, there is illustrated in FIGS. 2 through 4 a multi-sectioned panel air filter assembly 110 with each sectioned filter portion having a different media to remove different types of contaminants, constructed in accordance with the principles of the present invention.

As a background and in order to assist in the understanding of the present invention, the prior art filter 10 in FIG. 1 will be discussed briefly before the detailed explanation of the present invention. The prior art filter 10 depicts a conventional panel air filter with its air inlet side 12 facing the viewer. Although the dimensions and configurations of panel filters vary greatly depending on the type of panel filter and the particular housing unit for the filter, the conventional panel air filter 10 is generally illustrated to represent the most popular configuration used in the industry.

The air filter 10 is defined by a filter element 14 of a fibrous material and a substantially rectangular frame 16. The conventional filter 10 has approximately a depth $X'$ of one inch, a length $Y'$ of 20 inches and a width $Z'$ of 16 inches. The filter element 14 is affixed to and interposed within the structure of frame 16. The filter element 14 is a very thin, highly resilient fiber medium. The substantially uniform thickness of the fiber medium allows air to flow therethrough in order to filter out unwanted and unhealthy contaminants from the air.

Generally, because a particular fiber medium only filters out one type of specific air contaminant, the type of medium selected, from among the many different types of media, is an important decision. Seeing that the goals of most air filters are to filter out the maximum amount of pollutant and to extend the lifetime of the filter so as to reduce the number of times of having to replace the filter, most conventional air filters only contain one type of fiber media, and thus, only filters out one type of pollutant.

With reference now in detail to FIG. 2, a multi-sectioned, panel air filter assembly 110, with its air inlet side 112 facing the viewer, is illustrated and constructed in accordance with the principles of the present invention. The multi-sectioned, panel air filter assembly 110 includes a filter element 114 and a frame 116. Horizontal frame members 118, 120 and vertical frame members 122,124 are collectively configured to create the substantially rectangular frame 116. The frame members are preferably made from waterproof paperboard, but may be fabricated of metal, plastic, jute board, thin pressed board or other suitable materials. The multi-sectioned filter assembly 110 has approximately a depth X of one inch, a length Y of 20 inches and a width Z of 16 inches. Although these dimensions are the preferred embodiment, the dimensions of the filter 110 may be any size without deviating from the scope of the present invention.

The filter element 114 is sectioned along dotted lines 115a-115c into four substantially equally-dimensioned and separate filter portions 126-129 as shown in FIG. 2. Each sectioned filter portion 126-129 includes a specific type of medium and is distinct from one another. For example, the medium of sectioned filter portion 126 filters out carbon dioxide, the medium of sectioned filter portion 127 filters out sulfur dioxide, the medium of sectioned filter portion 128 filters out nitrous oxide and the medium of sectioned filter portion 129 filters out mercury. Although the sectioned filter portions 126-129 of the preferred embodiment specifically filter out the aforementioned pollutants, each sectioned filter portion 126-129 may be of any type of media so as to filter out any particular type of pollutant.

Even though the filter element 114 is formed of four distinct sectioned filter portions 126-129, the portions are arranged in abutting engagement to one another so as to avoid any gaps or by-pass between each portion. The first filter portion 126 is adjacently positioned along the dotted line 115a to the second filter portion 127 so that the engagement between the first filter portion 126 and the second filter portion 127 lacks any discernable gaps. The second filter portion 127 is adjacently positioned along the dotted line 115b to the third filter portion 128 so that the engagement between the second filter portion 127 and the third filter portion 128 lacks any discernable gaps. The third filter portion 128 is adjacently positioned along the dotted line 115c to the fourth filter portion 129 so that the engagement between the third filter portion 128 and the fourth filter portion 129 lacks any discernable gaps.

The sectioned filter portions 126-129 of the filter element 114 are very thin, highly resilient fiber medium. The substantially uniform thickness of the fiber medium of each portion 126-129 allows air to flow therethrough in order to filter out unwanted and unhealthy contaminants from the air. The filter element 114 is securely affixed to and interposed within the structure of frame 116 so that the frame supports the marginal edges of the filter element 114.

FIG. 3 shows a pictorial representation of a conventional large heating, ventilating and air conditioning (HVAC) system 320, illustrating the particular location of a filter bank 420 within the system 320. Further, FIG. 4 illustrates the multi-sectioned, panel air filter assembly 110 in use within filter bank 420, which is part of the conventional large heating, ventilating and air conditioning system 320 of FIG. 3. As mentioned before, because the filter assembly 110 is not limited in size to the dimensions of about 16"×20"×1", the principles of the present invention may also be adapted to accommodate other dimensioned filters for use in other systems.

Figure 5:
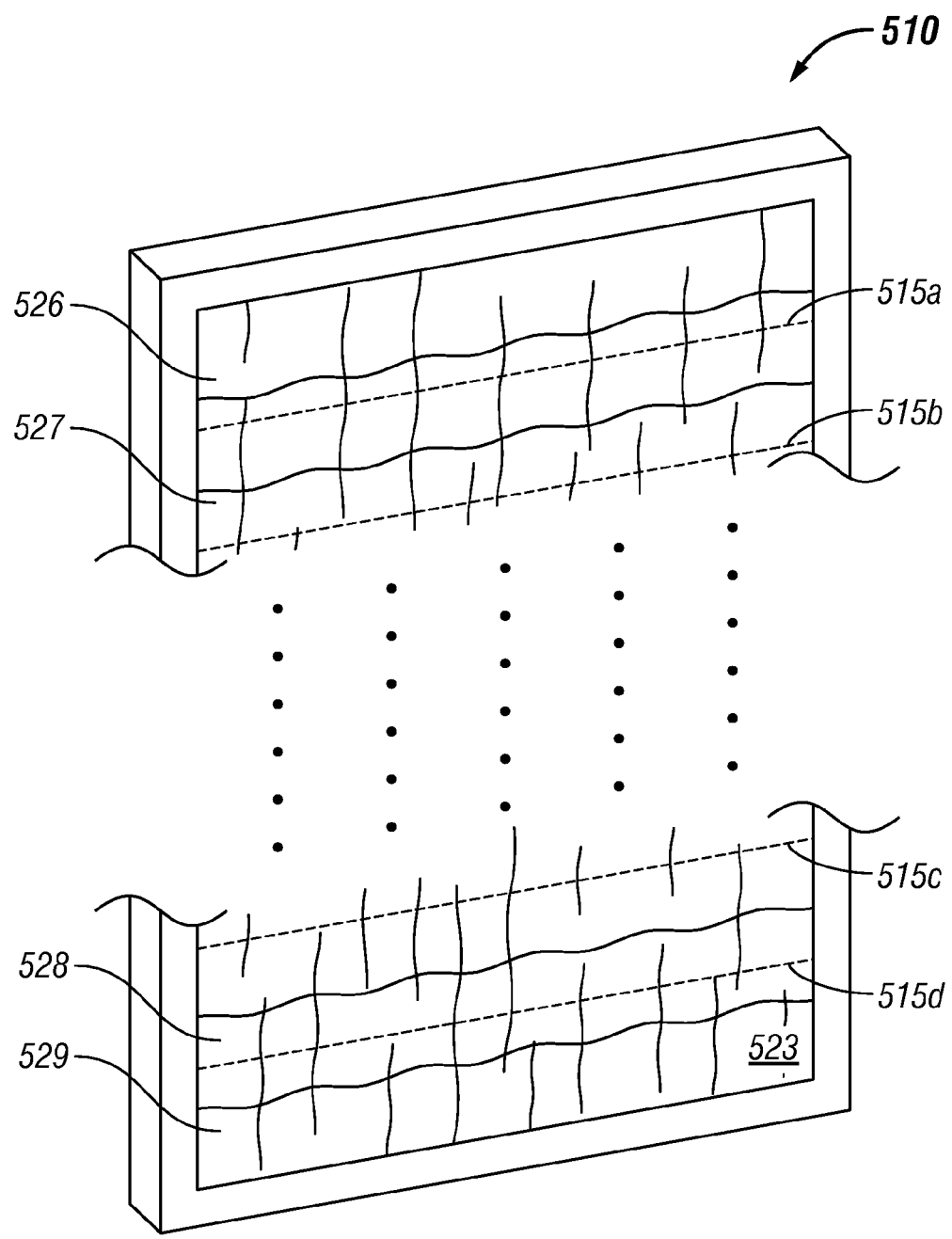
FIG. 5 is a perspective view of an alternative embodiment of the multi-sectioned, panel air filter assembly showing a multiplicity of sectioned filter portions in accordance with the present invention.

An alternative embodiment of the present invention is shown in FIG. 5. FIG. 5 shows a multi-sectioned, panel air filter assembly 510 that has a similar structure to that of the multi-sectioned panel air filter assembly 110 of FIG. 2, except that the filter element 514 of filter assembly 510 includes at least four substantially equally-dimensioned and separate filter portions 526-529 sectioned along dotted lines 515a-515d. In other words, the filter assembly 510 can filter out more than four different types of pollutants from the air.

It should be appreciated by those skilled in the art that the filter media of the multi-sectioned, panel air filter assembly in the present invention may be made of coarse or fine fiberglass fibers, polyester fibers, mineral wool fibers, quartz fibers, graphite fibers, horse hair, cellular plastic foams or any other suitable material.

From the foregoing detailed description, it can thus be seen that the present invention provides a single, multi-sectioned, panel air filter assembly for use in HVAC systems with each sectioned filter portion having a different media to remove different types of contaminants so as to maximize the indoor air quality of large office and school buildings.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. A panel air filter assembly for use in heat, ventilating and air conditioning (HVAC) systems, said filter assembly comprising:
   a multi-sectioned filter element of fibrous material having a first sectioned filter portion, a second sectioned filter portion, a third sectioned filter portion and a fourth sectioned filter portion;
   said first sectioned filter portion being adjacently positioned in a side-by-side relationship to said second sectioned filter portion so that the engagement between edges of said first sectioned filter portion and edges of said second sectioned filter portion lacks any discernable gaps;
   said second sectioned filter portion being adjacently positioned in a side-by-side relationship to said third sectioned filter portion so that the engagement between the edges of said second sectioned filter portion and edges of said third sectioned filter portion lacks any discernable gaps;
   said third sectioned filter portion being adjacently positioned in a side-by-side relationship to said fourth sectioned filter portion so that the engagement between the edges of said third sectioned filter portion and edges of said fourth sectioned filter portion lacks any discernable gaps;
   a substantially rectangular frame, said frame securely supporting said filter element at its marginal edges;

each of said first through fourth sectioned filter portions being of substantially equal dimensions; and each of said first through fourth sectioned filter portions being formed of a single layer of a specific type of medium which is distinct from one another so as to remove different types of contaminants from outdoor supply air before entering occupied spaces of buildings via the HVAC systems.

2. A panel air filter assembly as claimed in claim 1, wherein said substantially rectangular frame is manufactured from waterproof paperboard.

3. A panel air filter assembly as claimed in claim 1, wherein said substantially rectangular frame has the dimension of approximately 16"×20"×1".

4. A panel air filter assembly as claimed in claim 1, wherein said first filter portion contains a medium that filters out carbon dioxide.

5. A panel air filter assembly as claimed in claim 4, wherein said second filter portion contains a medium that filters out sulfur dioxide.

6. A panel air filter assembly as claimed in claim 5, wherein said third filter portion contains a medium that filters out nitrous oxide.

7. A panel air filter assembly as claimed in claim 6, wherein said fourth filter portion contains a medium that filters out mercury.

8. A panel air filter assembly for use in heat, ventilating and air conditioning (HVAC) systems, comprising:

multi-sectioned filter element means for removing contaminants from the outdoor supply air having at least a first sectioned filter portion, a second sectioned filter portion, a third sectioned filter portion and a fourth sectioned filter portion;

said first sectioned filter portion being adjacently positioned in a side-by-side relationship to said second sectioned filter portion so that the engagement between edges of said first sectioned filter portion and edges of said second sectioned filter portion lacks any discernable gaps;

said second sectioned filter portion being adjacently positioned in a side-by-side relationship to said third sectioned filter portion so that the engagement between the edges of said second sectioned filter portion and edges of said third sectioned filter portion lacks any discernable gaps;

said third sectioned filter portion being adjacently positioned in a side-by-side relationship to said fourth sectioned filter portion so that the engagement between the edges of said third sectioned filter portion and edges of said fourth sectioned filter portion lacks any discernable gaps;

support means for securely supporting said multi-sectioned filter element means at its marginal edges;

each of said first through fourth sectioned filter portions being of substantially equal dimensions; and each of said first through fourth sectioned filter portions being formed of a single layer of a specific type of medium which is distinct from one another.

9. A panel air filter assembly as claimed in claim 8, wherein said support means is a substantially rectangular frame.

10. A panel air filter assembly as claimed in claim 9, wherein said support means has the dimension of approximately 16"×20"×1".

11. A panel air filter assembly as claimed in claim 8, wherein said first filter portion contains a medium that filters out carbon dioxide.

12. A panel air filter assembly as claimed in claim 11, wherein said second filter portion contains a medium that filters out sulfur dioxide.

13. A panel air filter assembly as claimed in claim 12, wherein said third filter portion contains a medium that filters out nitrous oxide.

14. A panel air filter assembly as claimed in claim 13, wherein said fourth filter portion contains a medium that filters out mercury.

* * * * *